(12) United States Patent
Huang et al.

(10) Patent No.: US 8,259,218 B2
(45) Date of Patent: Sep. 4, 2012

(54) PHOTOGRAPHING MODULE WITH OPTICAL ZOOM

(75) Inventors: Chen Yi Huang, Taichung (TW); Te Sheng Tseng, Taichung (TW); Chao Yang Chen, Taichung (TW); Yi-Chuan He, legal representative, Taichung County (TW); Wen Hung Hsu, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 298 days.

(21) Appl. No.: 12/813,591

(22) Filed: Jun. 11, 2010
(Under 37 CFR 1.47)

(65) Prior Publication Data
US 2011/0141320 A1   Jun. 16, 2011

(30) Foreign Application Priority Data
Oct. 12, 2009   (TW) ............................ 98142220 A (51) Int. Cl.
*H04N 5/225* (2006.01)
(52) U.S. Cl. .................. 348/360; 348/340; 348/676
(58) Field of Classification Search .............. 348/335, 348/340, 344, 360; 359/676, 694, 703, 704
See application file for complete search history.

(56) References Cited

U.S. PATENT DOCUMENTS

| 5,289,318 | A  | * | 2/1994 | Sekine et al. ............. 359/813 |
| 7,202,011 | B2 | * | 4/2007 | Yoon et al. ............... 430/270.1 |
| 8,184,167 | B2 | * | 5/2012 | Inaba ..................... 348/208.99 |
| 2006/0033818 | A1 | | 2/2006 | Wada et al. |
| 2006/0226713 | A1 | * | 10/2006 | Lehr et al. ................... 310/12 |
| 2009/0052037 | A1 | | 2/2009 | Wernersson |
| 2009/0208196 | A1 | | 8/2009 | Ohno et al. |

FOREIGN PATENT DOCUMENTS
WO         2008029671 A1   3/2008
* cited by examiner

*Primary Examiner* — Tuan Ho
(74) *Attorney, Agent, or Firm* — Morris Manning & Martin LLP; Tim Tingkang Xia, Esq.

(57) ABSTRACT

This invention provides a photographing module with optical zoom, which at least includes a focusing lens assembly, a zoom lens assembly, a focusing lens actuator, a zoom lens actuator, a photo sensor and a vibration sensor. The focusing lens actuator at least includes a first movable member, a first fixed member and a first electric unit, wherein the first electric unit can drive the first movable member to proceed axial displacement and incline at an angle with respect to at least one axis. The zoom lens actuator at least includes a second movable member, a second fixed member and a second electric unit, wherein the second electric unit can drive the second movable member to proceed axial displacement. Alternatively, the axial inclination driven by the first electric unit of the focusing lens actuator may be driven by the second electric unit of the zoom lens actuator.

16 Claims, 5 Drawing Sheets

PHOTOGRAPHING MODULE WITH OPTICAL ZOOM

BACKGROUND OF THE INVENTION

1. Field of the Invention

The present invention relates to a photographing module, and more particularly, to a photographing module with optical zoom for use within a digital camera or a cell phone camera.

2. Description of the Related Art

In recent years, with the increasing developments of consumer electronic products, the demand for digital consumer products is becoming even larger than before while product quality is becoming even more essential for consumers. Digital camera users, for example, hold higher standards towards shooting quality, hoping to capture their life moments with high-quality images.

However, most of the conventional digital cameras or cell phone cameras are either equipped with digital zoom only or with limited optical zoom. Instead of moving a camera zoom lens along an optical axis, digital zoom is achieved by magnifying an image, or by cropping and then magnifying an area of an image that has been shot with maximum pixels. Therefore, when comparing the cropped and magnified area of an image with the original image, the former contains fewer pixels. By contrast, in an optical zoom system, the focal length and the refraction angle of light are adjustable because the lens elements can move along the optical axis. Thus, with optical zoom, the magnified image will have the same amount of pixels as the original image; that is, comparing with using optical zoom, using digital zoom makes image quality poorer. For example, if an original image taken by a photographing system with digital zoom has 8 million pixels, after an area of the original image is cropped and magnified using digital zoom, the magnified image may have only 2 million pixels. By contrast, if an original image taken by a photographing system with optical zoom has 8 million pixels, the magnified image will have 8 million pixels as well; the zoom in/out operation does not affect the image quality.

Given the fact that a photographing module with digital zoom results in poor image quality, there remains a need in the art for an improved photographing module with optical zoom to resolve the aforementioned drawback.

SUMMARY OF THE INVENTION

According to one aspect of the present invention, a photographing module with optical zoom is provided, which at least includes a focusing lens assembly, a zoom lens assembly, a focusing lens actuator, a zoom lens actuator, a photo sensor and a vibration sensor, wherein: the focusing lens assembly comprises at least one lens element and is equipped with a focusing function of an optical system; the zoom lens assembly comprises at least one lens element and is equipped with a zoom function of an optical system; the focusing lens actuator at least includes a first movable member, a first fixed member and a first electric unit, the first movable member having a hollow central portion around an optical axis of the photographing module and being associated with the focusing lens assembly, the first fixed member having a hollow central portion around the optical axis to receive the first movable member, and the first electric unit being located at a proper position in the photographing module to drive the first movable member to proceed axial displacement and incline at an angle with respect to at least one axis; the zoom lens actuator at least includes a second movable member, a second fixed member and a second electric unit, the second movable member having a hollow central portion around the optical axis of the photographing module and being associated with the zoom lens assembly, the second fixed member having a hollow central portion around the optical axis to receive the second movable member, and the second electric unit being located at a proper position in the photographing module to drive the second movable member to at least proceed axial displacement; the photo sensor is located on an image side of the photographing module; and the vibration sensor is located at a proper position in the photographing module to detect directions and magnitude of a vibration.

Moreover, in the aforementioned photographing module, the focusing lens actuator and the zoom lens actuator are interchangeable; the axial inclination with respect to at least one axis driven by the first electric unit of the focusing lens actuator may also be driven by the second electric unit of the zoom lens actuator.

According to another aspect of the present invention, a photographing module with optical zoom is provided, which at least includes a focusing lens assembly, a zoom lens assembly, a focusing lens actuator, a zoom lens actuator, a photo sensor and a vibration sensor, wherein: the focusing lens assembly comprises at least one lens element and is equipped with a focusing function of an optical system; the zoom lens assembly comprises at least one lens element and is equipped with a zoom function of an optical system; the focusing lens actuator at least includes a first movable member, a first fixed member and a first electric unit, wherein the first movable member is provided with at least three coil accommodation spaces and has a hollow central portion around an optical axis of the photographing module to be associated with the focusing lens assembly; the first fixed member is provided with at least three magnet accommodation spaces and has a hollow central portion around the optical axis for receiving the first movable member, each magnet accommodation space corresponding to one of the coil accommodation spaces; and the first electric unit includes at least three magnets and at least three coils, each magnet being received by one of the magnet accommodation spaces and the directions of magnetic poles thereof being perpendicular to the optical axis, each coil being received by one of the coil accommodation spaces and an axis with respect to which the coil winds being perpendicular to the optical axis, and the first electric unit being able to drive the first movable member to move with respect to the optical axis and incline at an angle with respect to at least one axis; the zoom lens actuator at least includes a second movable member, a second fixed member and a second electric unit, the second movable member having a hollow central portion around the optical axis of the photographing module and being associated with the zoom lens assembly, the second fixed member having a hollow central portion around the optical axis to receive the second movable member, and the second electric unit being located at a proper position in the photographing module to drive the second movable member to at least move with respect to the optical axis; the photo sensor is located on an image side of the photographing module; and the vibration sensor is located at a proper position in the photographing module to detect directions and magnitude of a vibration.

Moreover, in the aforementioned photographing module, the focusing lens actuator and the zoom lens actuator are interchangeable; the axial inclination with respect to at least one axis driven by the first electric unit of the focusing lens actuator may also be driven by the second electric unit of the zoom lens actuator.

The present invention provides a quality photographing module with optical zoom. The photographing module uses a lens assembly that moves with respect to the optical axis to perform a zoom function, and at the same time, the module uses a lens assembly that moves with respect to the optical axis and inclines at an angle with respect to at least one axis to perform a focusing function, thus providing compensation for image blurs due to vibrations caused by handheld shooting. Furthermore, in the photographing module of the present invention, the compensation for axial inclination may also be provided by the zoom lens assembly.

DETAILED DESCRIPTION OF THE PREFERRED EMBODIMENTS

The preferred embodiments of a photographing module with optical zoom of the present invention will be described in detail with reference to the accompanying drawings.

Figure 1:
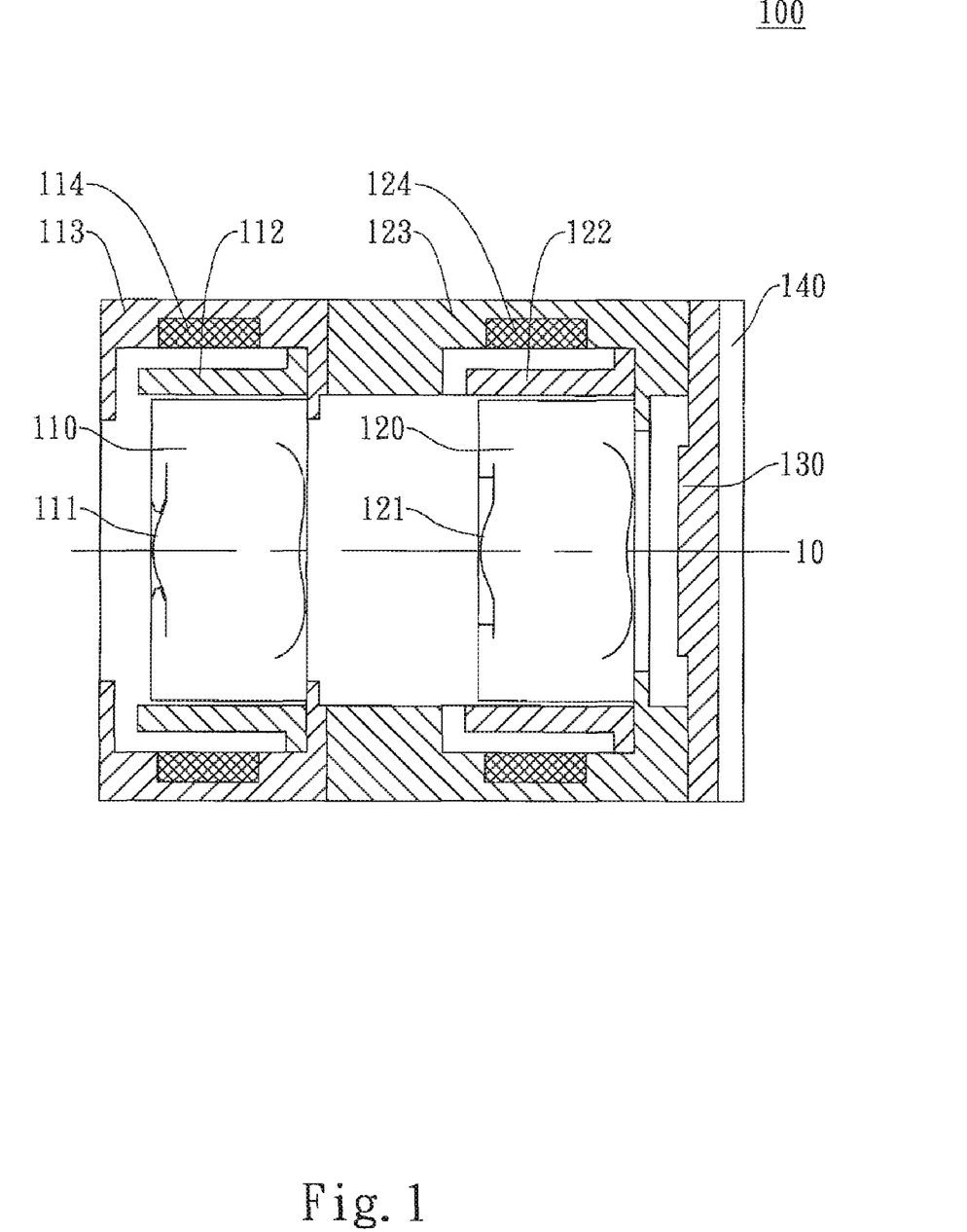
FIG. 1 shows a schematic cross-sectional view of a photographing module with optical zoom in accordance with a first embodiment of the present invention.

FIG. 1 shows a schematic cross-sectional view of a photographing module with optical zoom in accordance with a first embodiment of the present invention. In this embodiment, a photographing module 100 with optical zoom at least includes a focusing lens assembly 110, a zoom lens assembly 120, a focusing lens actuator, a zoom lens actuator, a photo sensor 130 and a vibration sensor 140. The focusing lens assembly 110 comprises at least one lens element 111 and is equipped with a focusing function of an optical system; the zoom lens assembly 120 comprises at least one lens element 121 and is equipped with a zoom function of an optical system. The focusing lens actuator at least includes a first movable member 112, a first fixed member 113 and a first electric unit 114. The first movable member 112 has a hollow central portion around an optical axis 10 of the photographing module 100 to form a lens accommodation space, so that the first movable member 112 can be associated with the focusing lens assembly 110. In addition, the at least one lens element of the focusing lens assembly 110 may be associated directly within the first movable member 112 to form an integral part (not shown) in the photographing module 100. The first fixed member 113 has a hollow central portion around the optical axis 10 to receive the first movable member 112. The first electric unit 114 is located on the inner wall of the first fixed member 113, opposite the first movable member 112; alternatively, the first electric unit 114 may be located at another proper position in the photographing module 100 to drive the first movable member 112 to proceed axial displacement. The zoom lens actuator at least includes a second movable member 122, a second fixed member 123 and a second electric unit 124. The second movable member 122 has a hollow central portion around the optical axis 10 to form a lens accommodation space, so that the second movable member 122 can be associated with the zoom lens assembly 120. In addition, the at least one lens element of the zoom lens assembly 120 may be associated directly within the second movable member 122 to form an integral part (not shown) in the photographing module 100. The second fixed member 123 has a hollow central portion around the optical axis 10 to receive the second movable member 122. The second fixed member 123 is located at the rear of the first fixed member 113, so that the focusing lens assembly 110 is located on an object side of the zoom lens assembly 120. The second electric unit 124 is located on the inner wall of the second fixed member 123, opposite the second movable member 122; alternatively, the second electric unit 124 may be located at another proper position in the photographing module 100 to drive the second movable member 122 to proceed axial displacement and incline at an angle with respect to at least one axis. The photo sensor 130 is located on an image side of the photographing module 100. The vibration sensor 140 is located at the rear of the photo sensor 130 near the image side; alternatively, the vibration sensor 140 may be located at another proper position in the photographing module 100 to detect directions and magnitude of a vibration.

The vibration sensor 140 may be embodied as, for example, a gyro or other accelerometers. After detecting the directions and magnitude of a vibration, the vibration sensor 140 sends feedback data to a processing and control circuit (not shown) of the photographing module 100. After running an algorithm, the processing and control circuit drives the second electric unit 124 with proper current values and operation modes. The second electric unit 124 thus drives the second movable member 122 to move with respect to the optical axis 10 to perform a zoom operation; other than this axial movement, the second movable member 122 may also be driven to incline at an angle with respect to at least one axis at the same time so as to compensate for the tilting angle due to vibrations caused by handheld shooting. And the first electric unit 114 drives the first movable member 112 to move with respect to the optical axis 10 to perform a focusing operation for the photographing module 100. The first electric unit 114 and the second electric unit 124 may use a piezoelectric, shape memory alloy (SMA) or stepper motor structure.

Figure 2:
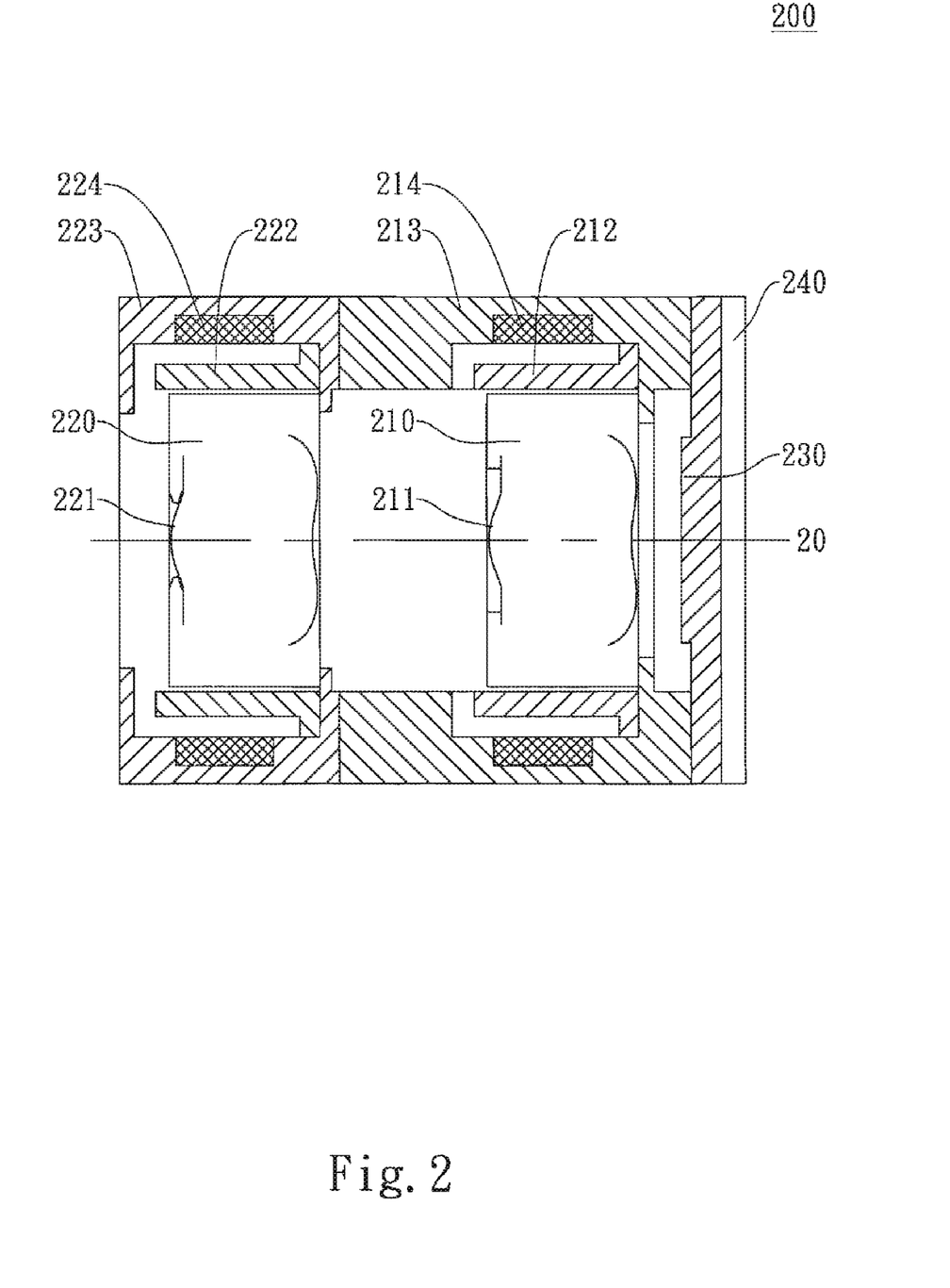
FIG. 2 shows a schematic cross-sectional view of a photographing module with optical zoom in accordance with a second embodiment of the present invention.

FIG. 2 shows a schematic cross-sectional view of a photographing module with optical zoom in accordance with a second embodiment of the present invention. In this embodiment, a photographing module 200 with optical zoom uses the focusing lens actuator to produce the axial inclination with respect to at least one axis so as to compensate for the tilting angle. The photographing module 200 with optical zoom at least includes a focusing lens assembly 210, a zoom lens assembly 220, a focusing lens actuator, a zoom lens actuator, a photo sensor 230 and a vibration sensor 240. The focusing lens assembly 210 comprises at least one lens element 211 and is equipped with a focusing function of an optical system; the zoom lens assembly 220 comprises at least one lens element 221 and is equipped with a zoom function of an optical system. The focusing lens actuator at least includes a first movable member 212, a first fixed member 213 and a first electric unit 214. The first movable member 212 has a hollow central portion around an optical axis 20 of the photographing module 200 to form a lens accommodation space, so that the first movable member 212 can be associated with the focusing lens assembly 210. In addition, the at least one lens element of the focusing lens assembly 210 may be associated directly within the first movable member 212 to form an integral part (not shown) in the photographing module 200. The first fixed member 213 has a hollow central portion around the optical axis 20 to receive the first movable member 212. The first electric unit 214 is located on the inner wall of the first fixed member 213, opposite the first movable member 212; alternatively, the first electric unit 214 may be located at another proper position in the photographing module 200 to drive the first movable member 212 to proceed axial displacement and incline at an angle with respect to at least one axis. The zoom lens actuator at least includes a second movable member 222, a second fixed member 223 and a second electric unit 224. The second movable member 222 has a hollow central portion around the optical axis 20 to form a lens accommodation space, so that the second movable member 222 can be associated with the zoom lens assembly 220. In addition, the at least one lens element of the zoom lens assembly 220 may be associated directly within the second movable member 222 to form an integral part (not shown) in the photographing module 200. The second fixed member 223 has a hollow central portion around the optical axis 20 to receive the second movable member 222. The second fixed member 223 is located in front of the first fixed member 213, so that the zoom lens assembly 220 is located on an object side of the focusing lens assembly 210. The second electric unit 224 is located on the inner wall of the second fixed member 223, opposite the second movable member 222; alternatively, the second electric unit 224 may be located at another proper position in the photographing module 200 to drive the second movable member 222 to proceed axial displacement. The photo sensor 230 is located on an image side of the photographing module 200. The vibration sensor 240 is located at the rear of the photo sensor 230 near the image side; alternatively, the vibration sensor 240 may be located at another proper position in the photographing module 200 to detect directions and magnitude of a vibration.

The second electric unit 224 is used for driving the second movable member 222 to move with respect to the optical axis 20 to perform a zoom operation for the photographing module 200. The vibration sensor 240 may be embodied as, for example, a gyro or other accelerometers. After detecting the directions and magnitude of a vibration, the vibration sensor 240 sends feedback data to a processing and control circuit (not shown) of the photographing module 200. After running an algorithm, the processing and control circuit drives the first electric unit 214 with proper current values and operation modes. The first electric unit 214 further drives the first movable member 212 to move with respect to the optical axis 20 to perform a focusing operation; other than this axial movement, the first movable member 212 may also be driven to incline at an angle with respect to at least one axis at the same time so as to compensate for the tilting angle due to vibrations caused by handheld shooting. The first electric unit 214 and the second electric unit 224 may use a piezoelectric, shape memory alloy (SMA) or stepper motor structure.

Figure 3:
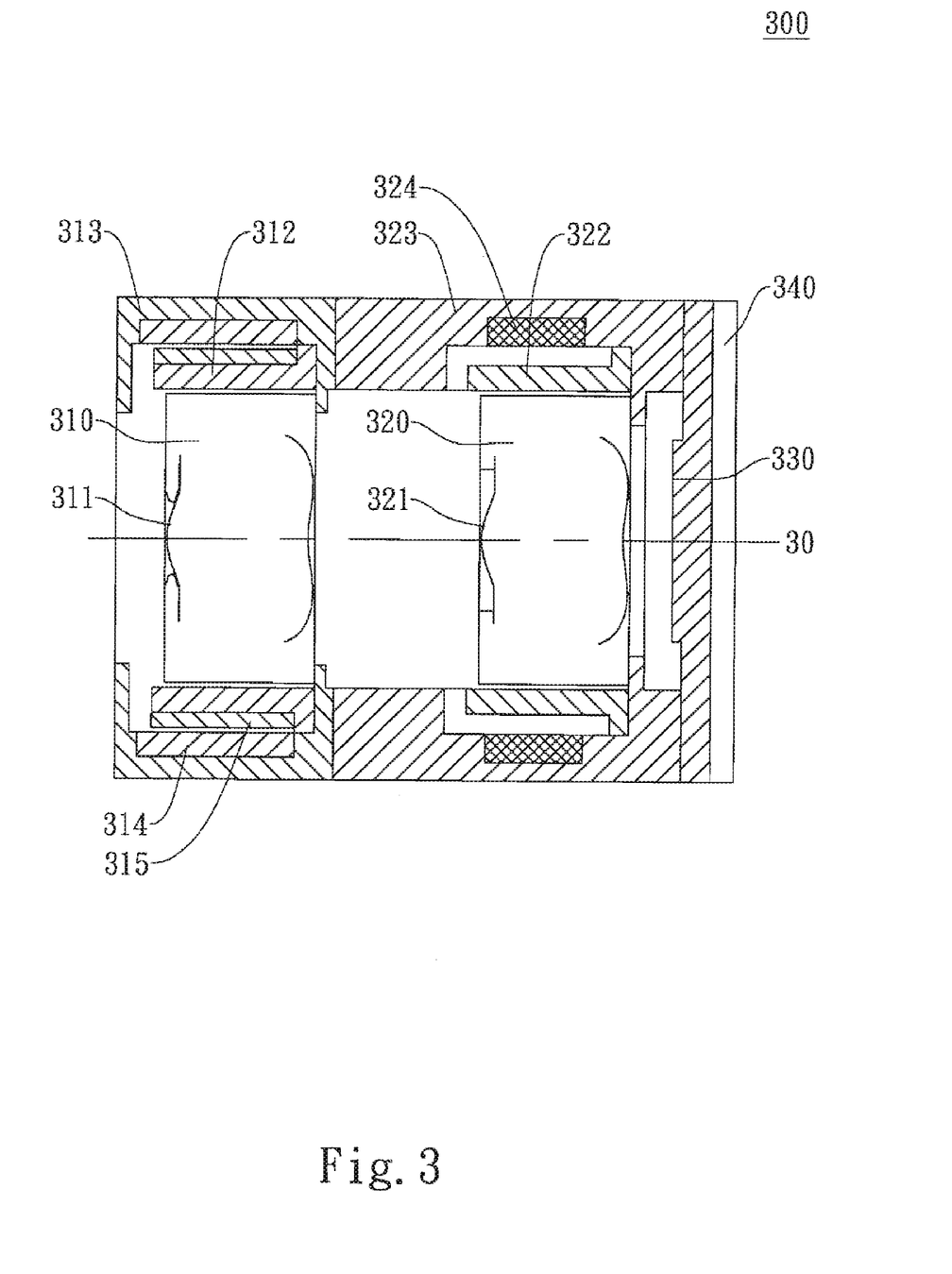
FIG. 3 shows a schematic cross-sectional view of a photographing module with optical zoom in accordance with a third embodiment of the present invention.

FIG. 3 shows a schematic cross-sectional view of a photographing module with optical zoom in accordance with a third embodiment of the present invention. In this embodiment, a photographing module 300 with optical zoom uses a moving-coil magnetic circuit system to drive the focusing lens actuator, thereby producing the axial inclination with respect to at least one axis so as to compensate for the tilting angle. The photographing module 300 with optical zoom at least includes a focusing lens assembly 310, a zoom lens assembly 320, a focusing lens actuator, a zoom lens actuator, a photo sensor 330 and a vibration sensor 340. The focusing lens assembly 310 comprises at least one lens element 311 and is equipped with a focusing function of an optical system; in addition, the at least one lens element of the focusing lens assembly 310 may be associated directly within a first movable member 312 to form an integral part (not shown) in the photographing module 300. The zoom lens assembly 320 comprises at least one lens element 321 and is equipped with a zoom function of an optical system; in addition, the at least one lens element of the zoom lens assembly 320 may be associated directly within a second movable member 322 to form an integral part (not shown) in the photographing module 300.

The focusing lens actuator at least includes a first movable member 312, a first fixed member 313 and a first electric unit. The first movable member 312 is provided with at least three coil accommodation spaces which are evenly and symmetrically disposed around it, and the first movable member 312 also has a hollow central portion around an optical axis 30 of the photographing module 300 to be associated with the focusing lens assembly 310. The first fixed member 313 is provided with at least three magnet accommodation spaces and has a hollow central portion around the optical axis 30 for receiving the first movable member 312, wherein each magnet accommodation space corresponds to one of the coil accommodation spaces. The first electric unit includes at least three magnets 314 and at least three coils 315. Each magnet 314 is received by one of the magnet accommodation spaces, and the directions of its magnetic poles are perpendicular to the optical axis 30. Each coil 315 is received by one of the coil accommodation spaces, and an axis with respect to which the coil wind is perpendicular to the optical axis 30. The first electric unit is able to drive the first movable member 312 to proceed axial displacement and incline at an angle with respect to at least one axis. The zoom lens actuator at least includes a second movable member 322, a second fixed member 323 and a second electric unit 324. The second movable member 322 has a hollow central portion around the optical axis 30 and is associated with the zoom lens assembly 320. The second fixed member 323 has a hollow central portion around the optical axis 30 to receive the second movable member 322; the second fixed member 323 is located at the rear of the first fixed member 313, so that the focusing lens assembly 310 is located on an object side of the zoom lens assembly 320. The second electric unit 324 is located on the inner wall of the second fixed member 323, opposite the position of the second movable member 322; alternatively, the second electric unit 324 may be located at another proper position in the photographing module 300 to drive the second movable member 322 to proceed axial displacement. The second electric unit 324 may use a piezoelectric, SMA or stepper motor structure. The photo sensor 330 is located on an image side of the photographing module 300. The vibration sensor 340 is located at the rear of the photo sensor 330 near the image side; alternatively, the vibration sensor 340 may be located at another proper position in the photographing module 300 to detect directions and magnitude of a vibration.

Figure 5:
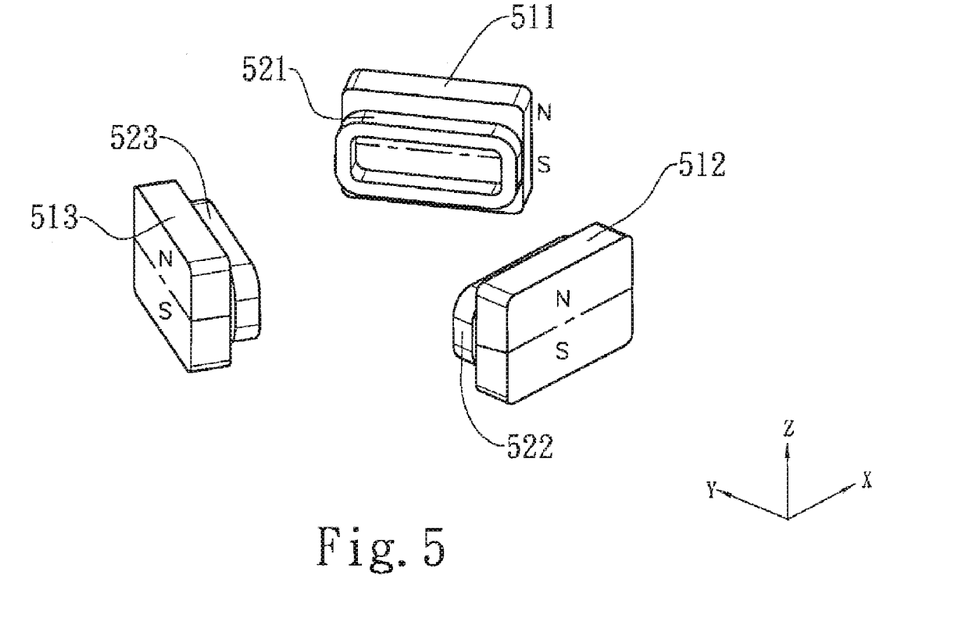
FIG. 5 shows a schematic perspective view of a magnetic circuit system of the photographing module with optical zoom in accordance with the third embodiment of the present invention.

FIG. 5 shows a schematic perspective view of a moving-coil magnetic circuit system of the photographing module 300 with optical zoom in accordance with the third embodiment of the present invention. The magnetic circuit system comprises three magnets 511, 512 and 513 and three coils 521, 522 and 523 so as to form three magnet-coil sets, and as described above, the three magnet-coil sets of the magnetic circuit system are evenly and symmetrically disposed around the first movable member 312. The first magnet-coil set comprises the magnet 511 and the coil 521; the second magnet-coil set comprises the magnet 512 and the coil 522; the third magnet-coil set comprises the magnet 513 and the coil 523. Each of the magnets 511, 512 and 513 is received by a corresponding magnet accommodation space of the first fixed member 313, and each of the coils 521, 522 and 523 is received by a corresponding coil accommodation space of the first movable member 312. In each magnet-coil set, the directions of the top and bottom magnetic poles of the magnet are opposite and perpendicular to the axis with respect to which the coil moves, and the axis with respect to which the coil winds is perpendicular to the direction with respect to which the coil moves. Take the second magnet-coil set as an example, the directions of the top and bottom magnetic poles of the magnet 512 are in the Y and −Y directions, respectively, and the axis with respect to which the coil 522 winds is Y-axis. When being directed to the coil 522, an electric current may, for example but not limited to, flow through the upper portion of the coil 522 in the X direction while passing through the lower portion of the coil 522 in the −X direction, such that the upper and lower portions of the coil 522 are acted upon by a force (Lorentz Force) in the Z direction; that is, the coil 522 moves in the Z direction. As the coil 522 is associated with the first movable member 312, the force further drives the first movable member 312.

In the aforementioned magnetic circuit system, a power source is used to drive the three coils, enabling the three coils and the corresponding magnets to generate a force to drive the first movable member 312. When the electric currents having the same current values are simultaneously directed to the three coils, the first movable member 312 can proceed axial displacement. For example, when the electric currents having the same current values are simultaneously directed to the three coils 521, 522 and 523, each of the three coils 521, 522 and 523 is acted upon by a force of the same magnitude in the Z direction, thereby enabling the first movable member 312 to move with respect to the Z-axis. When only one of the three coils is driven by the power source, the first movable member 312 can incline at an angle with respect to one axis. For example, when the coil 522 is the only one of the three coils driven by the power source, it is acted upon by a force in the Z direction, thereby enabling the first movable member 312 to incline at an angle with respect to the X-axis. When two of the three coils are driven by the power source, the first movable member 312 can incline at an angle with respect to more than one axis. For example, when the coils 522 and 523 are driven by the power source, each of the coils 522 and 523 is acted upon by a force in the Z direction, thereby enabling the first movable member 312 to incline at an angle with respect to the X-axis and the Y-axis at the same time. When the electric currents having different current values are directed to the three coils, the first movable member 312 can proceed axial displacement and incline at an angle with respect to multiple axes. For example, when the coils 521, 522 and 523 are driven by the power source and the current values of the electric currents flowing through the coils 522 and 523 are greater than that of the electric current passing through the coil 521, each of the coils 521, 522 and 523 is acted upon by a force in the Z direction and the forces applied to the coils 522 and 523 are greater than the force applied to the coil 521, thereby enabling the first movable member 312 to move with respect to the Z-axis and incline at an angle with respect to the X and Y axes at the same time. The first movable member 312 can at least proceed axial displacement and incline at an angle with respect to at least one axis depending on the current values and directions of the electric currents and the selection of the coils to which the electric currents are to be directed. By driving the coils with different modes as described above, autofocusing can be achieved for the photographing module and compensation for image blurs due to vibrations caused by handheld shooting can be performed.

That is to say, referring again to FIG. 3, the vibration sensor 340 detects the directions and magnitude of a vibration and then sends feedback data to a processing and control circuit (not shown) of the photographing module 300. After running an algorithm, the processing and control circuit drives the three coils 315 with proper current values and operation modes, thus enabling the three coils 315 and the corresponding magnets 314 to generate a force to drive the first movable member 312. As a result, the first movable member 312 will move with respect to the optical axis 30 or incline at an angle with respect to at least one axis at the same time.

The aforementioned magnetic circuit system is a moving-coil system. Alternatively, the magnetic circuit system may be embodied as a moving-magnet system by exchanging the positions of the magnet and the coil in each of the three magnet-coil sets shown in FIG. 5. For example, the positions of the magnet 511 and the coil 521 in the first magnet-coil set are exchanged, with the magnet 511 being associated with the first movable member 312 and the coil 521 being received by a coil accommodation space (the aforementioned magnet accommodation space is replaced with the coil accommodation space) of the first fixed member 313. In the present invention, the first fixed member 313, which is associated with the moving-coil system or the moving-magnet system, may be made of magnetic conductive material to increase the magnetic efficiency.

Figure 6:
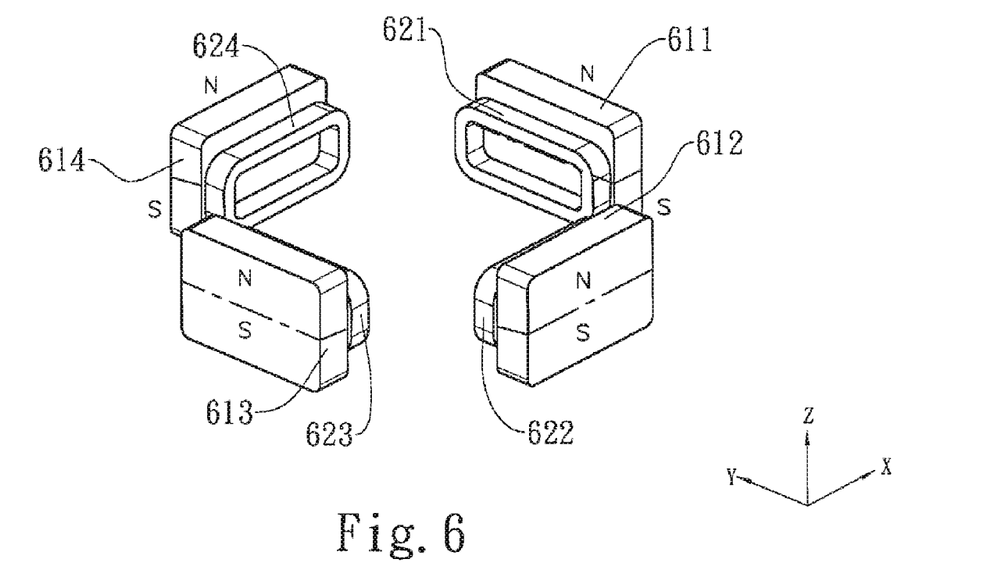
FIG. 6 shows a schematic perspective view of a magnetic circuit system alternative to the one shown in FIG. 5.

FIG. 6 shows a schematic perspective view of an alternative moving-coil magnetic circuit system used in the third embodiment of the present invention. The magnetic circuit system comprises four magnets 611, 612, 613 and 614 and four coils 621, 622, 623 and 624 so as to form four magnet-coil sets; the four magnet-coil sets of the magnetic circuit system are evenly and symmetrically disposed around the first movable member 312. The first magnet-coil set comprises the magnet 611 and the coil 621; the second magnet-coil set comprises the magnet 612 and the coil 622; the third magnet-coil set comprises the magnet 613 and the coil 623; and the fourth magnet-coil set comprises the magnet 614 and the coil 624. Each of the magnets 611, 612, 613 and 614 is received by a corresponding one of the four magnet accommodation spaces of the first fixed member 313. Each of the coils 621, 622, 623 and 624 is received by a corresponding one of the four coil accommodation spaces of the first movable member 312. The operation principal of this magnetic circuit system is the same as that of the magnetic circuit system with three magnet-coil sets as shown in FIG. 5, and therefore, this magnet circuit system can drive the first movable member 312 to proceed axial displacement and incline at an angle with respect to at least one axis. The magnetic circuit system in FIG. 6 is a moving-coil system; alternatively, it may be embodied as a moving-magnet system by exchanging the positions of the magnet and the coil in each of the four magnet-coil sets shown in FIG. 6. For example, the positions of the magnet 611 and the coil 621 in the first magnet-coil set are exchanged, with the magnet 611 being associated with the first movable member 312 and the coil 621 being received by a corresponding coil accommodation space (the aforementioned magnet accommodation space is replaced with the coil accommodation space) of the first fixed member 313.

Figure 4:
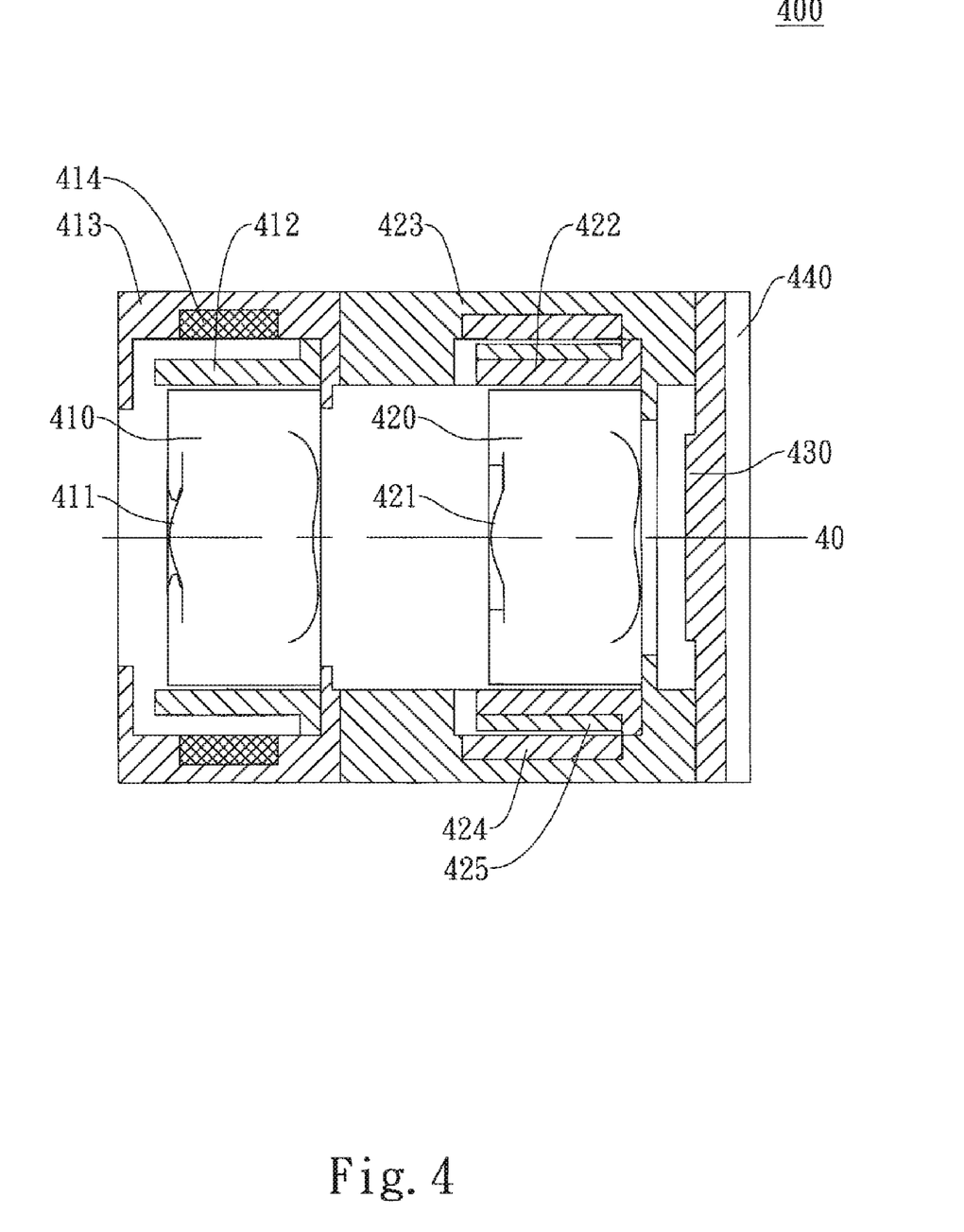
FIG. 4 shows a schematic cross-sectional view of a photographing module with optical zoom in accordance with a fourth embodiment of the present invention.

FIG. 4 shows a schematic cross-sectional view of a photographing module with optical zoom in accordance with a fourth embodiment of the present invention. In this embodiment, a photographing module 400 with optical zoom at least includes a focusing lens assembly 410, a zoom lens assembly 420, a focusing lens actuator, a zoom lens actuator, a photo sensor 430 and a vibration sensor 440. The focusing lens assembly 410 comprises at least one lens element 411 and is equipped with a focusing function of an optical system; in addition, the at least one lens element of the focusing lens assembly 410 may be associated directly within a first movable member 412 to form an integral part (not shown) in the photographing module 400. The zoom lens assembly 420 comprises at least one lens element 421 and is equipped with a zoom function of an optical system; in addition, the at least one lens element of the zoom lens assembly 420 may be associated directly within a second movable member 422 to form an integral part (not shown) in the photographing module 400.

The focusing lens actuator at least includes a first movable member 412, a first fixed member 413 and a first electric unit 414. The first movable member 412 has a hollow central portion around an optical axis 40 of the photographing module 400 to form a lens accommodation space, so that the first movable member 412 can be associated with the focusing lens assembly 410. In addition, the at least one lens element of the focusing lens assembly 410 may be associated directly within the first movable member 412 to form an integral part (not shown) in the photographing module 400. The first fixed member 413 has a hollow central portion around the optical axis 40 to receive the first movable member 412. The first electric unit 414 is located on the inner wall of the first fixed member 413, opposite the first movable member 412; alternatively, the first electric unit 414 may be located at another proper position in the photographing module 400 to drive the first movable member 412 to proceed axial displacement. The first electric unit 414 may use a piezoelectric, SMA or stepper motor structure. The zoom lens actuator at least includes a second movable member 422, a second fixed member 423 and a second electric unit. The second movable member 422 is provided with at least three coil accommodation spaces which are evenly and symmetrically disposed around it, and the second movable member 422 also has a hollow central portion around the optical axis 40 of the photographing module 400 to be associated with the zoom lens assembly 420. The second fixed member 423 is provided with at least three magnet accommodation spaces and has a hollow central portion around the optical axis 40 for receiving the second movable member 422, wherein each magnet accommodation space corresponds to one of the coil accommodation spaces. The second fixed member 423 is located at the rear of the first fixed member 413, so that the focusing lens assembly 410 is located on an object side of the zoom lens assembly 420. The second electric unit includes at least three magnets 424 and at least three coils 425. Each magnet 424 is received by one of the magnet accommodation spaces, and the directions of its magnetic poles are perpendicular to the optical axis 40. Each coil 425 is received by one of the coil accommodation spaces, and an axis with respect to which the coil winds is perpendicular to the optical axis 40. The second electric unit is able to drive the second movable member 422 to proceed axial displacement and incline at an angle with respect to at least one axis. The photographing module 400 also uses a moving-coil magnetic circuit system as shown in FIG. 5 to drive the zoom lens assembly 420 to perform a zoom operation or incline with respect to at least one axis at the same time. Similarly, the photographing module 400 may alternatively use a moving-coil system as shown in FIG. 6. The photo sensor 430 is located on an image side of the photographing module 400. The vibration sensor 440 is located at the rear of the photo sensor 430 near the image side; alternatively, the vibration sensor 440 may be located at another proper position in the photographing module 400 to detect directions and magnitude of a vibration.

The magnetic circuit system in the above fourth embodiment as shown in FIG. 4 is a moving-coil system; alternatively, it may be embodied as a moving-magnet system by exchanging the positions of the magnet and the coil in each of the four magnet-coil sets shown in FIG. 4. In the photographing module 400 of the present invention, the second fixed member 423, which is associated with the moving-coil system or the moving-magnet system, may be made of magnetic conductive material to increase the magnetic efficiency.

In the embodiments described above, the relative positions of the components in either the focusing lens assembly or in the zoom lens assembly shall be taken as exemplary rather than limitative. The focusing lens actuator and the focusing lens assembly may be located on the object side of the zoom lens actuator; on the other hand, the zoom lens actuator and the zoom lens assembly may be located on the object side of the focusing lens actuator. Moreover, the number of the magnet-coil sets in each embodiment shall be taken as exemplary rather than limitative. The magnet-coil sets are evenly and symmetrically disposed around the movable member, and one coil is opposite one magnet in each magnet-coil set.

The preferred embodiments described above are exemplary and are not intended to limit the claim scope of the present invention. Various modifications and variations made within the spirit of the invention shall be considered as falling within the scope of the appended claims.

What is claimed is:

1. A photographing module with optical zoom, at least including a focusing lens assembly, a zoom lens assembly, a focusing lens actuator, a zoom lens actuator, a photo sensor and a vibration sensor, wherein:

the focusing lens assembly comprises at least one lens element and is equipped with a focusing function of an optical system;

the zoom lens assembly comprises at least one lens element and is equipped with a zoom function of an optical system;

the focusing lens actuator at least includes a first movable member, a first fixed member and a first electric unit, the first movable member having a hollow central portion around an optical axis of the photographing module and being associated with the focusing lens assembly, the first fixed member having a hollow central portion around the optical axis to receive the first movable member, and the first electric unit being located at a proper position in the photographing module to drive the first movable member to proceed axial displacement and incline at an angle with respect to at least one axis;

the zoom lens actuator at least includes a second movable member, a second fixed member and a second electric unit, the second movable member having a hollow central portion around the optical axis of the photographing module and being associated with the zoom lens assembly, the second fixed member having a hollow central portion around the optical axis to receive the second movable member, and the second electric unit being located at a proper position in the photographing module to drive the second movable member to at least proceed axial displacement;

the photo sensor is located on an image side of the photographing module; and the vibration sensor is located at a proper position in the photographing module to detect directions and magnitude of a vibration.

2. The photographing module with optical zoom according to claim 1, wherein the at least one lens element of the focusing lens assembly is associated directly within the first movable member of the focusing lens actuator.

3. The photographing module with optical zoom according to claim 1, wherein the at least one lens element of the zoom lens assembly is associated directly within the second movable member of the zoom lens actuator.

4. The photographing module with optical zoom according to claim 1, wherein the focusing lens actuator is located on an object side of the zoom lens actuator.

5. The photographing module with optical zoom according to claim 1, wherein the zoom lens actuator is located on an object side of the focusing lens actuator.

6. The photographing module with optical zoom according to claim 1, wherein the focusing lens actuator and the zoom lens actuator are interchangeable.

7. A photographing module with optical zoom, at least including a focusing lens assembly, a zoom lens assembly, a focusing lens actuator, a zoom lens actuator, a photo sensor and a vibration sensor, wherein:
the focusing lens assembly comprises at least one lens element and is equipped with a focusing function of an optical system;
the zoom lens assembly comprises at least one lens element and is equipped with a zoom function of an optical system;
the focusing lens actuator at least includes a first movable member, a first fixed member and a first electric unit, wherein the first movable member is provided with at least three coil accommodation spaces and has a hollow central portion around an optical axis of the photographing module to be associated with the focusing lens assembly; the first fixed member is provided with at least three magnet accommodation spaces and has a hollow central portion around the optical axis for receiving the first movable member, each magnet accommodation space corresponding to one of the coil accommodation spaces; and the first electric unit includes at least three magnets and at least three coils, each magnet being received by one of the magnet accommodation spaces and the directions of magnetic poles thereof being perpendicular to the optical axis, each coil being received by one of the coil accommodation spaces and an axis with respect to which the coil winds being perpendicular to the optical axis, and the first electric unit being able to drive the first movable member to proceed axial displacement and incline at an angle with respect to at least one axis;
the zoom lens actuator at least includes a second movable member, a second fixed member and a second electric unit, the second movable member having a hollow central portion around the optical axis of the photographing module and being associated with the zoom lens assembly, the second fixed member having a hollow central portion around the optical axis to receive the second movable member, and the second electric unit being located at a proper position in the photographing module to drive the second movable member to at least proceed axial displacement;
the photo sensor is located on an image side of the photographing module; and
the vibration sensor is located at a proper position in the photographing module to detect directions and magnitude of a vibration.

8. The photographing module with optical zoom according to claim 7, wherein the at least one lens element of the focusing lens assembly is associated directly within the first movable member of the focusing lens actuator.

9. The photographing module with optical zoom according to claim 7, wherein the at least one lens element of the zoom lens assembly is associated directly within the second movable member of the zoom lens actuator.

10. The photographing module with optical zoom according to claim 7, wherein the focusing lens actuator is located on an object side of the zoom lens actuator.

11. The photographing module with optical zoom according to claim 7, wherein the zoom lens actuator is located on an object side of the focusing lens actuator.

12. The photographing module with optical zoom according to claim 7, wherein the focusing lens actuator includes at least four magnets and at least four coils.

13. The photographing module with optical zoom according to claim 7, wherein the directions of the top and bottom magnetic poles of each magnet are opposite.

14. The photographing module with optical zoom according to claim 7, wherein the coils are evenly and symmetrically disposed around the first movable member.

15. The photographing module with optical zoom according to claim 7, wherein the focusing lens actuator uses a moving-magnet structure.

16. The photographing module with optical zoom according to claim 7, wherein the focusing lens actuator and the zoom lens actuator are interchangeable.

* * * * *

UNITED STATES PATENT AND TRADEMARK OFFICE
CERTIFICATE OF CORRECTION

PATENT NO. : 8,259,218 B2
APPLICATION NO. : 12/813591
DATED : September 4, 2012
INVENTOR(S) : Chen Yi Huang et al.

Page 1 of 1

It is certified that error appears in the above-identified patent and that said Letters Patent is hereby corrected as shown below:

On the Cover of the Letters Patent item 30:

Delete the priority date "Oct. 12, 2009".

Insert the priority date -- Dec. 10, 2009 --.

Signed and Sealed this
Sixth Day of November, 2012

David J. Kappos
*Director of the United States Patent and Trademark Office*